April 24, 1928.

A. A. LANDON 1,667,164

HEATING APPARATUS

Filed March 10, 1924    2 Sheets-Sheet 1

Inventor
Archer A. Landon
BY Conrad A. Dieterich
his ATTORNEY.

April 24, 1928.

A. A. LANDON 1,667,164

HEATING APPARATUS

Filed March 10, 1924    2 Sheets-Sheet 2

Inventor
Archer A. Landon
BY Conrad A Dieterich
his ATTORNEY

Patented Apr. 24, 1928.

1,667,164

UNITED STATES PATENT OFFICE.

ARCHER A. LANDON, OF BUFFALO, NEW YORK.

HEATING APPARATUS.

Application filed March 10, 1924. Serial No. 697,995.

This invention relates to furnaces, and more particularly to furnaces for heating enclosures containing highly inflammable or combustible material, vapors or gases, as, for example, garages. This invention is designed especially for small, isolated garages which are not heated from a central heating plant but are usually heated from a stove or furnace within the garage. In heating such structures the danger from fire is so great that the various boards of underwriters for fire insurance purposes will not permit the installation of a heating apparatus in which the burning fuel may be brought into contact with the vapors or gases present or apt to arise in the structure to be heated. It is the principal object of this invention therefore to provide a heating apparatus capable of being readily installed within a structure or building of the type described, but in which the part or parts containing the incandescent or burning fuel are so constructed and arranged as to render it impossible for the combustible matter to communicate therewith.

A further object is the provision of a furnace having a sealed portion with no openings, and a portion with various usual openings therein; the sealed portion being disposed within the structure to be heated while the other portion is disposed without the same.

A further object is the provision of a heating apparatus in which substantially the entire heat emitting portion is located within the structure to be heated, and only those portions, having the necessary openings for the operation of the apparatus, located without said structure.

A further object is the provision of means on said heating apparatus for insulating or separating the portion of the heating apparatus disposed without the structure against communication with the interior thereof.

A further object is the provision of a heating apparatus having all the usual necessary openings, such as the fuel supply, ash-pit, flue and smoke outlet, all arranged upon one end or side thereof.

A further object is the provision of a heating apparatus of the type described positioned as described with respect to the structure to be heated, and a fireproof enclosure surrounding the front of said furnace for preventing undue radiation of heat, and the scattering of coals, cinders, etc.

Other objects and advantages will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings, wherein I have shown what I now consider to be the preferred form of my invention, and forming part of this specification—

Figure 1:
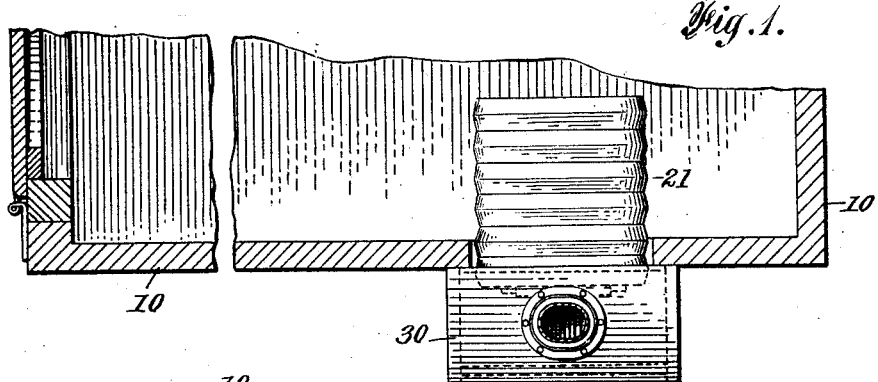
Figure 1 is a horizontal section through a structure to be heated and having my invention applied thereto.
Figures 2, 3:
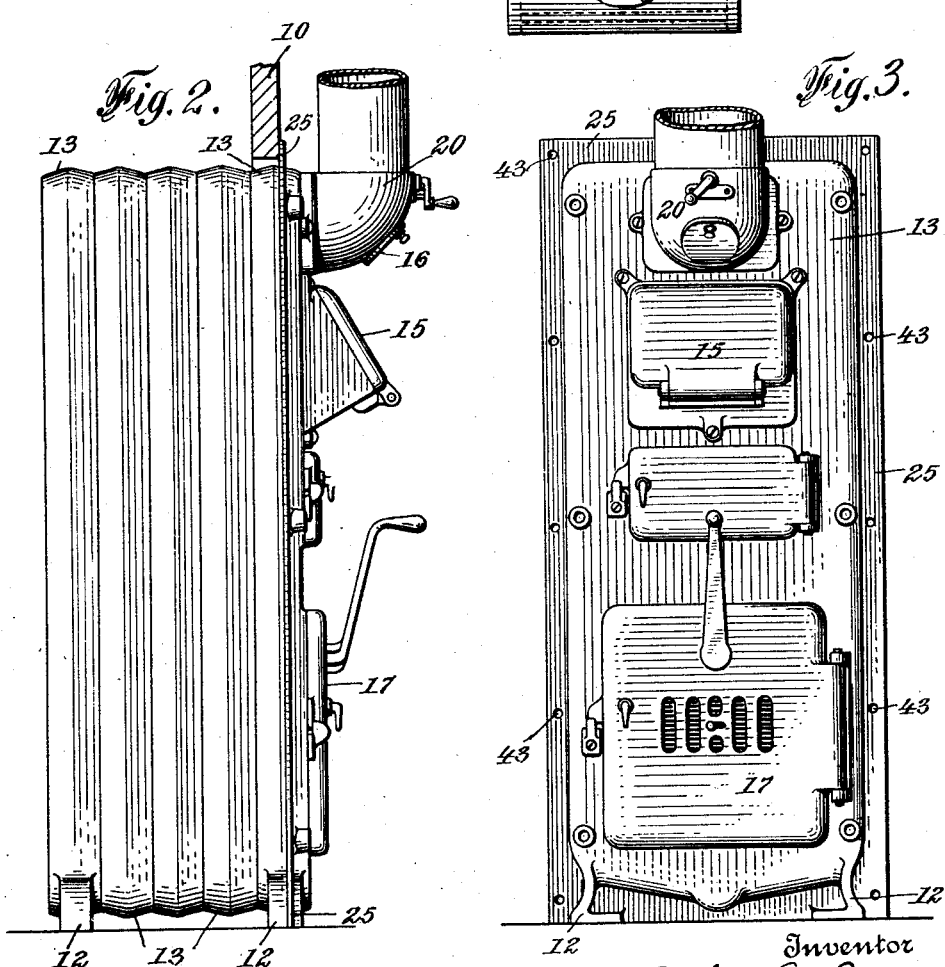
Fig. 2 is a side elevation of the furnace shown in Fig. 1.
Fig. 3 is a front elevation of the furnace.
Figure 4:
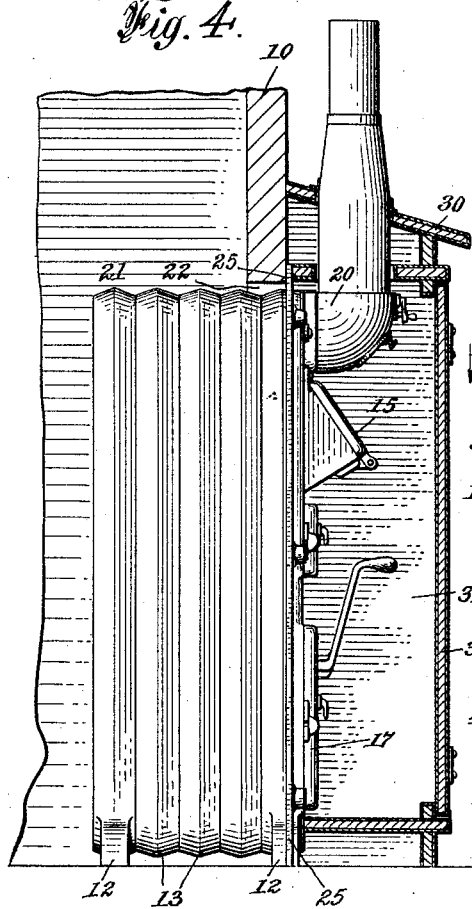
Fig. 4 is a vertical section through the structure to be heated, showing the furnace applied thereto.
Figure 5:
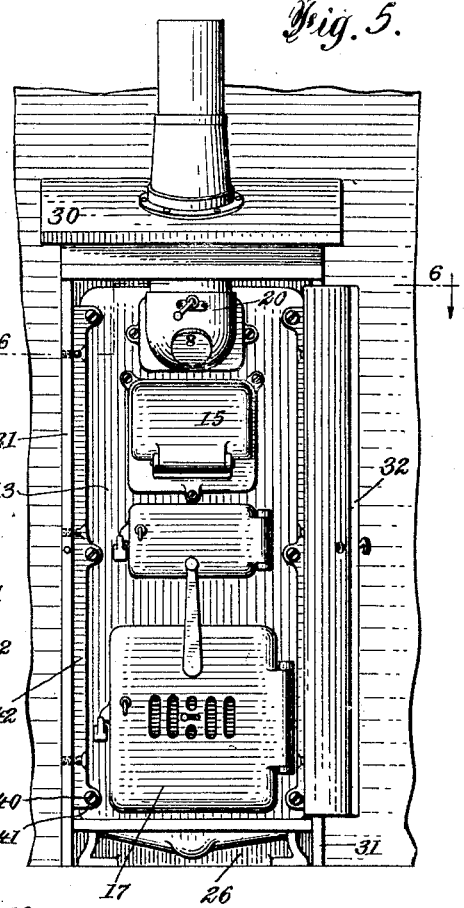
Fig. 5 is a front elevation of the furnace applied to the structure.
Figure 6:
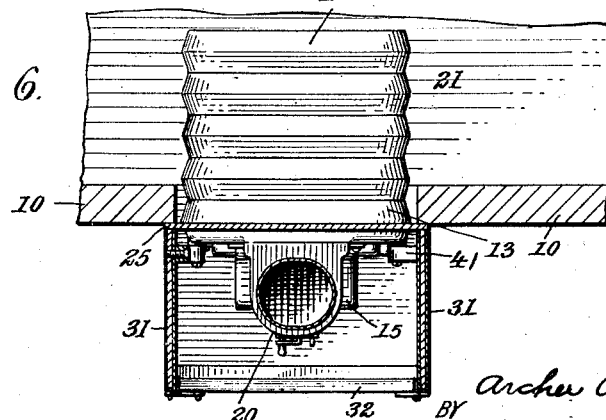
Fig. 6 is a vertical section on the line 6—6 of Fig. 5.

Referring to the drawings, there is shown a structure 10 of the type usually employed for storing a few cars and not connected to any central heating plant. I propose to heat such structures by my heating apparatus or boiler supported as usual upon legs 12 and comprising a plurality of sections 13. In the front face of the front section are provided the usual feed opening 15, flue-cleaning opening 16, ash-pit opening 17, and also the smoke outlet 20 which is usually positioned at the rear. The boiler contains no other openings, so that the entire body of the boiler from the front section rearwardly, which constitutes substantially the entire heat-emitting surface, is a sealed chamber 21.

This sealed chamber or body portion 21 is inserted into the garage through an opening 22 cut through the wall thereof, and of slightly larger outline than the outline of said portion 21. Substantially the entire heat-emitting surface of the boiler is thus positioned within the structure. Formed integral with the front section, and a short distance back of the face thereof and parallel thereto is a flange 25 running completely around the body portion 21 and filling the space between the bottom of the body portion and the floor, as shown at 26. The body portion is inserted into the garage through opening 22 until the flange 25 abuts against the wall of the garage. The opening in the building is thus completely closed and the front exposed portion of the boiler is completely insulated and separated from the interior of the garage, so as to effectually prevent any communication with the interior of the garage by way of opening 22.

To prevent the too rapid radiation of heat at the front, and also to prevent scattering of hot cinders and coal, there may be provided an enclosure, in the form of a lean-to, at the front of the boiler. This enclosure or housing may consist of a roof 30, preferably slopping and through which the smoke flue extends, side walls 31 extending to the ground, and a door 32 hinged in a front wall or forming the front wall.

The boiler is attached, preferably to the lean-to, in any suitable manner, as by screws 40 passing through lugs 41 of a member 42 fixed to each side wall 31, said screws 40 extending through openings 43 in the flange 25.

From the foregoing description it will be obvious that as only the heat emitting portion of the boiler is located within the structure, and the parts necessary to obtain access to the interior of the boiler for operating the same are located without the structure and sealed against all communication with the interior of said structure, all danger of inflammable or combustible vapors or gases which may be present or which may collect therein, reaching the interior of the boiler is obviated, and all danger of fire precluded.

The above description illustrates the principles embodied in my invention, but it will be understood that various changes may be made within the scope of the invention as defined in the annexed claims.

Having thus described my said invention what I claim and desire to secure by Letters Patent is:

1. The combination of a structure to be heated having an opening in a wall thereof, with a heating apparatus of smaller outline than that of said opening and comprising a plurality of connected sections adapted to confine a heating fluid; the back and intermediate sections thereof extending freely through said opening and into said structure, and a front section extending without said structure and having openings in its exposed portion, a peripheral flange extending entirely around an exposed portion of said heating apparatus for securing said heating apparatus, as a whole, in position partly within and partly without said structure, and for sealing the space between said heating apparatus and the edge of the opening surrounding the same whereby to prevent communication between the interior of said structure and the interior of said heating apparatus by way of said space and the openings in said front section, substantially as specified.

2. The combination of a structure to be heated having an opening in a wall thereof, with a heating apparatus of smaller outline than that of said opening, and comprising a plurality of connected sections adapted to confine a heating fluid; the back and intermediate sections thereof extending freely through said opening and into said structure, and a front section extending without said structure and having openings in its exposed portion, a peripheral flange extending entirely around an exposed portion of said heating apparatus for securing said heating apparatus, as a whole, in position partly within and partly without said structure, and for sealing the space between said heating apparatus and the edge of the opening surrounding the same whereby to prevent communication between the interior of said structure and the interior of said heating apparatus by way of said space and the openings in said front section, a housing for the exposed frame portion of said heating apparatus, and means for securing said housing directly to the exposed front portion of said heating apparatus, substantially as specified.

3. The combination of a structure to be heated having an opening in a wall thereof, with a heating apparatus of smaller outline than said opening comprising a plurality of connected sections adapted to confine a heating fluid and whose back and intermediate sections constitute an exteriorly closed heat emitting surface extending into the opening in said structure, and a front section having an exposed portion provided with openings, and a peripheral flange extending entirely around said front section for securing the heating apparatus along the edges of said opening and in spaced relation to the edges thereof; said flange also serving to prevent communication between the interior of said structure and the interior of said heating apparatus by way of the space between said heating apparatus and the edges of the opening surrounding the same, and the openings in said front section, substantially as specified.

4. The combination of a structure to be heated having an opening in a wall thereof with a heating apparatus of smaller outline than said opening comprising a plurality of connected sections adapted to confine a heating fluid and whose back and intermediate sections constitute an exteriorly closed heat-emitting surface extending into said structure, and a front section having an exposed portion disposed without said opening and provided with openings, means on said front section for securing said heating apparatus partly within and partly without said opening and in spaced relation to the edges of said opening, and a housing having an opening therein, a door for said opening, and means on said housing for securing the same directly to the exposed front section of said heating apparatus, and against the outer wall portion of said structure surrounding the opening therein, substantially as specified.

5. The combination of a structure to be heated having an opening in a wall thereof with a heating apparatus of smaller outline than said opening comprising a plurality of connected sections adapted to confine a heating fluid and whose back and intermediate sections constitute an exteriorly closed heat-emitting surface extending into said structure, and a front section having an exposed portion disposed without said opening and provided with openings, means on said front section for securing said heating apparatus partly within and partly without said opening and in spaced relation to the edges of said opening, and a housing having an opening therein, a door for said opening, and attaching flanges upon the inner sides of said housing for securing the same directly to the exposed front section of said heating apparatus, and against the outer wall portion of said structure surrounding the opening therein, substantially as specified.

Signed at the city of New York, in the county and State of New York, this 7th day of November, one thousand nine hundred and twenty-three.

ARCHER A. LANDON.